United States Patent [19]

Turvey

[11] Patent Number: 5,161,568

[45] Date of Patent: Nov. 10, 1992

[54] SAFETY LOCKOUT VALVE AND COUPLING

[75] Inventor: Terry K. Turvey, Salem, Ohio

[73] Assignee: Keen Manufacturing, Inc., Salem, Ohio

[21] Appl. No.: 745,253

[22] Filed: Aug. 14, 1991

[51] Int. Cl.⁵ .............................................. F16K 35/00
[52] U.S. Cl. ....................................... 137/383; 251/96; 251/346
[58] Field of Search ................. 251/96, 341, 344, 346, 251/95; 137/383

[56] References Cited

U.S. PATENT DOCUMENTS

| 1,850,879 | 3/1932 | Hunt . | |
| 2,509,671 | 5/1950 | Christensen | 251/344 |
| 2,688,340 | 9/1954 | Stehlin | 137/383 |
| 3,094,306 | 6/1963 | Conrad | 251/344 |
| 3,750,752 | 8/1973 | Mott | 137/383 |
| 3,960,366 | 6/1976 | Abney et al. | 251/341 |

FOREIGN PATENT DOCUMENTS 6892 of 1910 United Kingdom ............... 137/383

Primary Examiner—A. Michael Chambers
Attorney, Agent, or Firm—Harpman & Harpman

[57] ABSTRACT

An improvement in a valve and coupling device for pressure lines utilized in transferring air or water under pressure to provide a safety lockout feature in which the valve control sleeve can be held in open or closed position in a positive manner by an ancillary lock. The improvement comprises a modified control sleeve and clamping jaw dependent on the valve coupling configuration used in relation to the connection requriement.

4 Claims, 3 Drawing Sheets

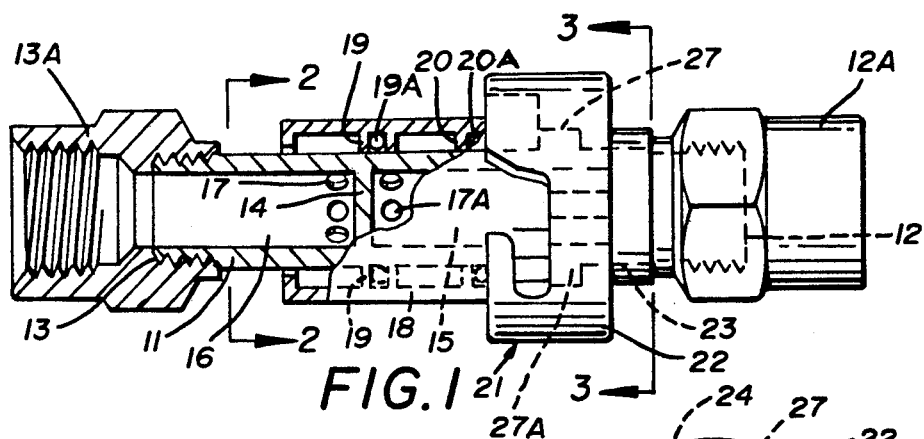
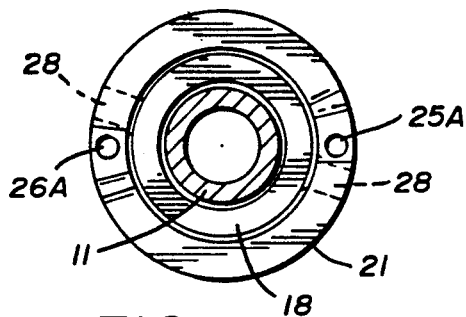
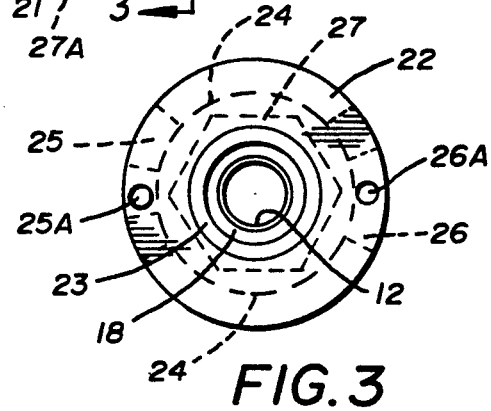
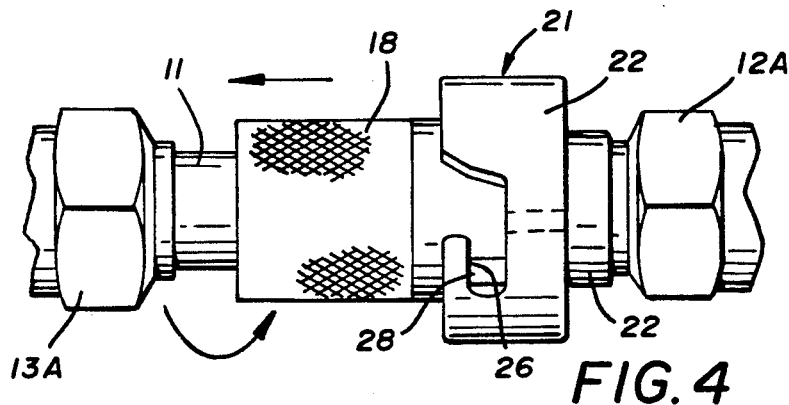
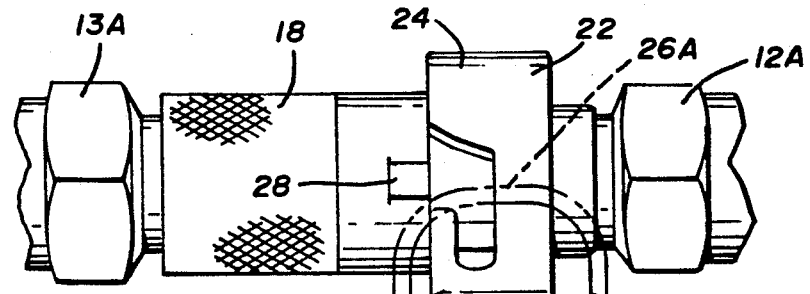
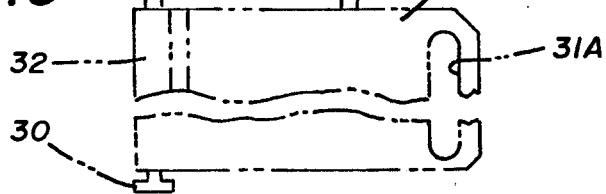

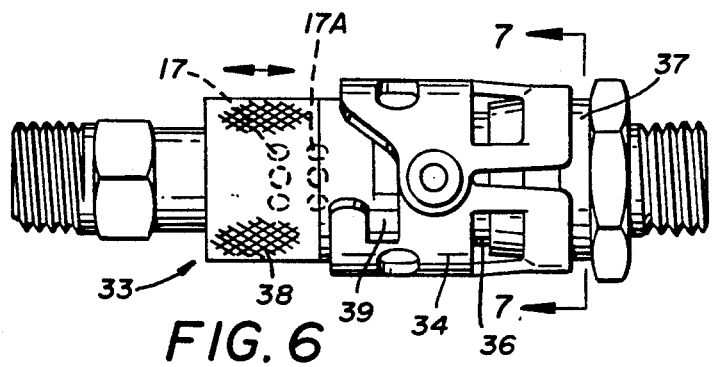
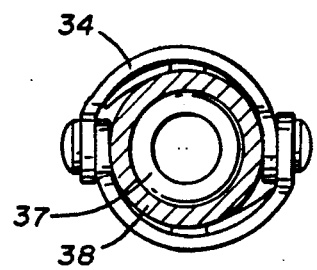
FIG. 6  FIG. 7
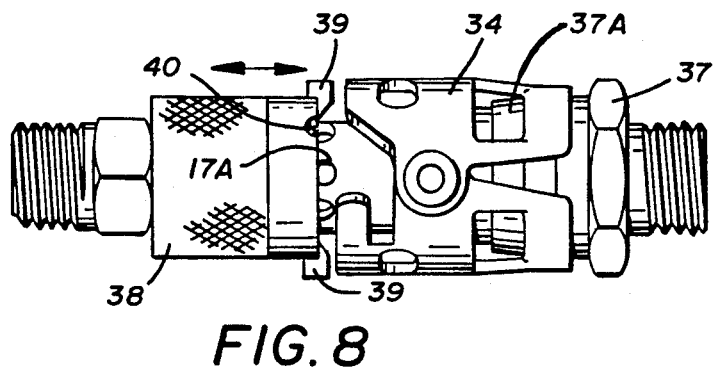
FIG. 8
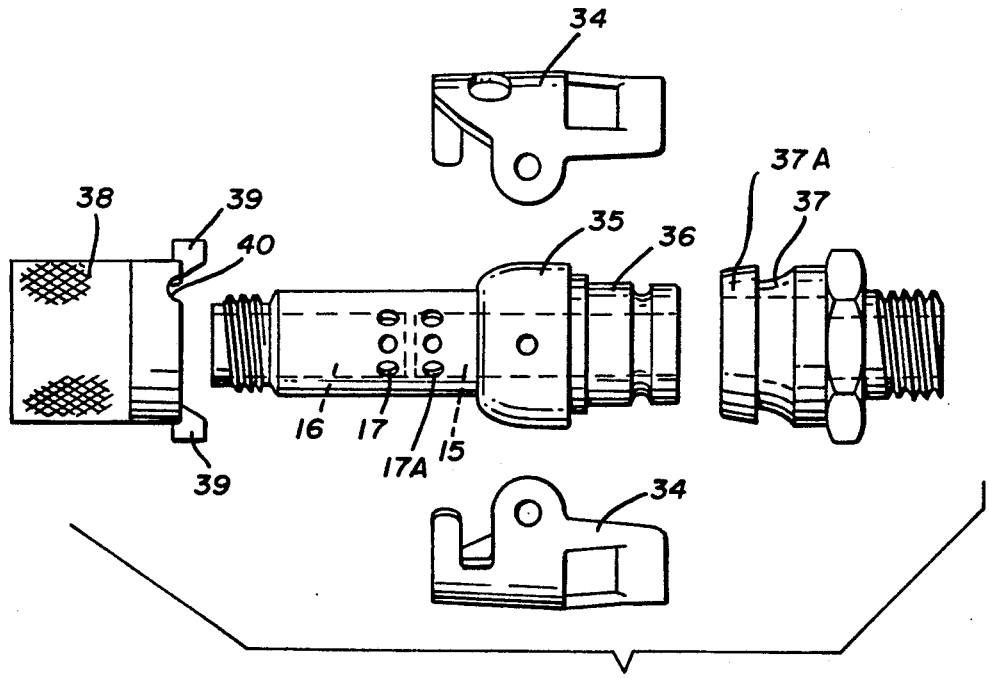
FIG. 9

SAFETY LOCKOUT VALVE AND COUPLING

BACKGROUND OF THE INVENTION

1. Technical Field

This improvement relates to valve and coupling devices used in pressure transfer lines for air or water that utilize a sliding control sleeve that vents to atmosphere in the off or open position.

2. Description of Prior Art

Prior art devices of this type have no specific safety lock-out feature and are directed to on and off positioning of the sliding control sleeve, see U.S. Pat. No. 1,850,879.

In U.S. Pat. No. 1,850,879 a valve and coupling assembly can be seen having a main tubular valve body with an inlet and an outlet port spaced by a partition therebetween. A plurality of aligned apertures extend annularly around the valve body adjacent either side of said partition. A control sleeve has a central, internal groove with oppositely disposed sealing rings attached thereto.

SUMMARY OF THE INVENTION

An improvement in a valve coupling assembly to provide positive lock open and lock close positioning of the valve. The valve and coupling assembly is modified to accept a locking device by improvements to the control sleeve and clamping jaws found on various forms of the valve and coupling assemblies.

DESCRIPTION OF THE DRAWINGS

FIG. 1 is a partial cross-sectional view of a modified valve and coupling device;

FIG. 2 is a section on lines 2—2 of FIG. 1;

FIG. 3 is a section on lines 3—3 of FIG. 1;

FIG. 4 is a perspective view of the modified valve and coupling device with a lock hasp in place in the off position;

FIG. 5 is a perspective view of the modified valve and coupling device with a lock hasp in place in the on position;

FIG. 6 is a side plan view of an alternate form of the invention with a clamping fitting positioned thereof;

FIG. 7 is a cross-section on lines 7—7 of FIG. 6;

FIG. 8 is a side plan view of the alternate form of the invention shown in FIG. 6 in open position;

FIG. 9 is an enlarged side plan view of the alternate form shown in FIGS. 6 and 8;

DESCRIPTION OF THE PREFERRED EMBODIMENT

Figure 10:
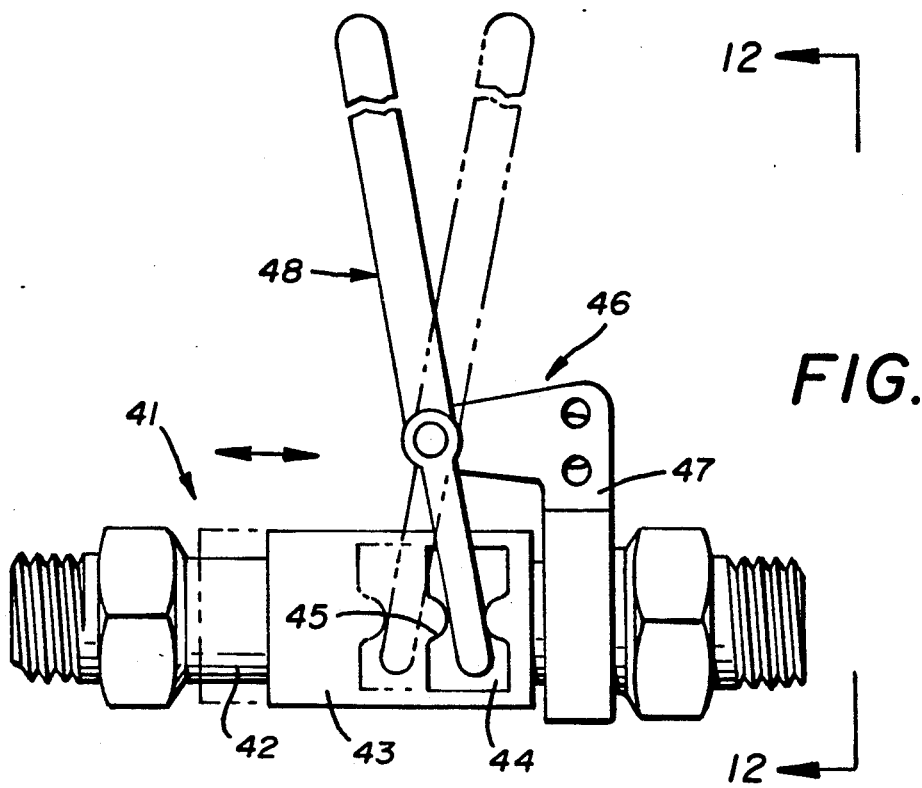
FIG. 10 is a side plan view of a second alternate form of the invention.

An improvement in a valve and coupling assembly 10 having a main tubular valve body 11 the oppositely disposed ends of which are open at 12 and 13 respectively with apertured fittings 12A and 12B positioned thereon. A central partition 14 is positioned between said openings at 12 and 13 and defines an inlet chamber 15 and an outlet chamber 16. A plurality of annularly aligned and spaced apertures 17 and 17A are formed respectively within each of said inlet and outlet chambers 15 and 16 adjacent the partition 14 respectively as best seen in FIG. 1 of the drawings.

A valving sleeve 18 is slideably positioned on said tubular valve body member 11 and has a pair of spaced internally formed grooves 19 and 20 each of which have O-ring seals 19A and 20A positioned therein. It will be evident to those skilled in the art that by moving the valve sleeve 18 on the tubular valve body 11 as indicated by the arrows in FIGS. 4 and 5 of the drawings that the respective inlet and outlet chambers will be interconnected between the O-ring seals 19A and 20A and thus the valve will be open. The position of the valve sleeve 18 shown in FIG. 1 would indicate a closed condition of the valve venting to atmosphere via the aperture 17 located in the valve chamber 16.

Referring now to FIGS. 1-5 a lockout fitting 21 can be seen having a generally annular body member 22 centrally apertured at 23. The lockout fitting 21 has a pair of semi-annular flanges 24 extending therefrom, portions of which are cut-a-way forming oppositely disposed tapered contoured slots 25 and 26 having apertures within at 25A and 26A respectively.

A positioning recess area 27 is formed within the annular body member 22 inwardly of said annular flange 24 for registration with a boss 27A on the tubular valve body member 11, best seen in FIGS. 1 and 3 of the drawings. The valving sleeve 18 has a pair of oppositely disposed control lugs 28 adjacent one end thereof facing said lockout fitting 21. Each of said control lugs 28 are registrably positioned within the respective slots 25 and 26 as seen in FIGS. 3-4 of the drawings with the valve sleeve 18 in the closed position.

Upon rotation of said valve sleeve 18 the control lugs 28 move out of their respective slots 25 and 26 allowing the valve sleeve 18 to be moved on the tubular valve body 11 away therefrom to an open position as shown in FIG. 5 of the drawings.

Referring now to FIGS. 4 and 5 of the drawings a portion of a lockout hasp 29 can be seen in broken lines having a hasp bar 30 that is pivotally secured within a multiple part support body member 31. The hasp bar 30 extends through the apertures at 26A in the annular body member 22 preventing access to the respective slots 25 and 26 by the control lug 28. In this example, the valve is effectively locked in open position.

In FIG. 4 of the drawings the insertion of the hasp bar 30 effectively locks the valve in closed position. The hasp support body 31 encloses the free end of the hasp bar 30 within and prevents same from being manipulated for removal from the body member 22 when the hasp body 31 is secured in locking position. The hasp support body 31 is of a two-part configuration hinged at 32 with the hasp bar 31 extending as a hinge pin therethrough. When closed it can be locked as noted above by insertion of a typical pad lock (not shown) through a locking opening 31A as best seen in FIG. 5 of the drawings.

Referring now to FIGS. 6-9 of the drawings, an alternate form of the improved improvement can be seen for use on a different form of the valve and clamping assembly 33 having the hereinbefore described inlet and outlet chambers 15 and 16 and apertured openings therein at 17 and 17A. In this example, the same valve element configuration is used with the addition of a two-part clamping cage 34 which is pivotally secured to an enlarged portion 35 of the valve 33 configured for a quick disconnect fitting 36 which registers with a female portion 37 of the fitting which has an engagement lip 37A into which the clamping cage 36 can be engaged and held as seen in FIGS. 8 and 9 of the drawings. A valve sleeve 38 having longitudinally and annularly extending lugs 39 is modified by a pair of oppositely disposed locking grooves 40 formed adjacent said respective lugs 39.

In operation, the hasp bar 30 of the lockout hasp 29 can be inserted through the valve body by alignment of the respective grooves 39 with the apertures 17 when in closed position.

Figure 11:
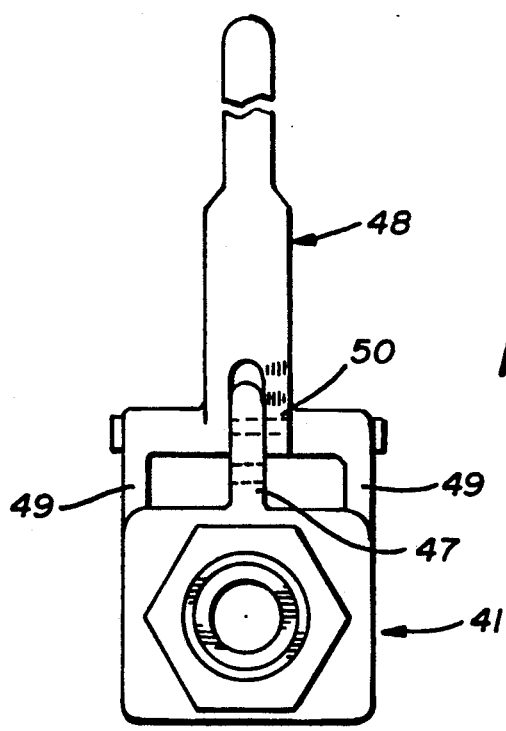
FIG. 11 is an end plan view on lines 11—11 of FIG. 10.

Referring now to FIGS. 10 and 11 of the drawings a third alternate form of the invention can be seen wherein a valve 41 is shown with the same basic configuration as the valve clamping assembly 11 hereinbefore described having a tubular valve body member 42 with a sliding valve sleeve 43. The sleeve 43 has a pair of oppositely disposed contoured control recesses 44 therein. Each of said recesses 44 is positioned inwardly of the sleeve 43 and has an area of reduced diameter at 45. A locking handle assembly 46 is secured to the body member 42 with an apertured handle support arm 47 extending therefrom. A bifurcated handle assembly 48 is pivotally secured to said handle support arm 47 having spaced control levers 49 extending therefrom. An apertured locking arm 50 extends from said handle 48 at right angles to said control levers 49 and can be aligned with said apertured support arm 47 dependent on the relative position of the bifurcated handle 48 as seen in FIG. 10 of the drawings.

Each of said control levers 49 register within said respective recessed areas 45 in said sleeve 43 so as to engage same and upon activation move the sleeve 43 from an i.e. closed to an open position as seen in broken lines in FIG. 10 of the drawings.

It will thus be seen that a new and novel improvement to a valve and coupling device has been illustrated and described and it will be apparent to those skilled in the art that various changes and modifications may be made therein without departing from the spirit of the invention, therefore I claim:

1. An improvement in a valve and coupling assembly comprising a tubular valve body, a pair of spaced longitudinally aligned chambers within said valve body, a plurality of annularly spaced apertures in each of said chambers, a valve sleeve registerable on said valve body, control lugs extending from said valve sleeve and sealing means from said valve sleeves selectively defining a passage between said chambers, the improvement comprises a lockout fitting on said valve body, oppositely disposed slots within said lockout fitting for removable registration of said control lugs therein, oppositely disposed apertures within said lockout fitting adjacent said slots, said control lugs movably positioned from a first open position adjacent said slots to a second closed position within said slots, a locking bar engagable through one of said apertures in said lockout fitting restricting access to said slots.

2. An improvement in a valve and coupling assembly comprising a tubular valve body, a pair of spaced longitudinally aligned chambers within said valve body, a plurality of annularly spaced apertures in each of said chambers, a valve sleeve registerable on said valve body and control lugs extending from said valve sleeve and sealing means within said valve sleeve selectively defining a passageway between said chambers, said improvement comprises a two-part clamping cage on said tubular valve body, said clamping cage having oppositely disposed slots registerable with said control lugs, said valving sleeve having a pair of oppositely disposed transversely aligned locking grooves adjacent said lugs, a hasp bar extending through oppositely disposed aligned annularly spaced apertures in one of said valve chambers and through said locking grooves restricting longitudinal movement of said valve sleeve on said valve body.

3. The improvement in a valve and coupling assembly comprising a tubular valve body, a pair of spaced longitudinally aligned chambers within said valve body, a plurality of aligned circumferentially spaced apertures in each of said chambers, a valving sleeve movably positioned on said valve body, sealing means within said valve sleeve selectively defining a passage between said chambers, the improvement comprising a pair of oppositely disposed controlled recesses in said sleeve, a lockout handle assembly on said tubular valve body, said lockout handle assembly comprising a fixed multiple apertured support arm, a bifurcated handle pivotally secured to said support arm, control arms and an apertured locking arm extending from said handle, said control arms registerable with said respective control recesses in said sleeve, means for aligning said apertured locking arm and support arm in relation to one another.

4. The improvement in a valve and coupling assembly of claim 3 wherein said means for aligning said apertured locking arm and said support arm in relation to one another comprises repositioning said bifurcated handle and said valving sleeve interconnected thereto.

* * * * *